Oct. 4, 1966     R. J. KOUTNIK     3,276,737
BALL VALVE FOR LOW TEMPERATURE FLUIDS
Filed Sept. 30, 1963     2 Sheets-Sheet 2
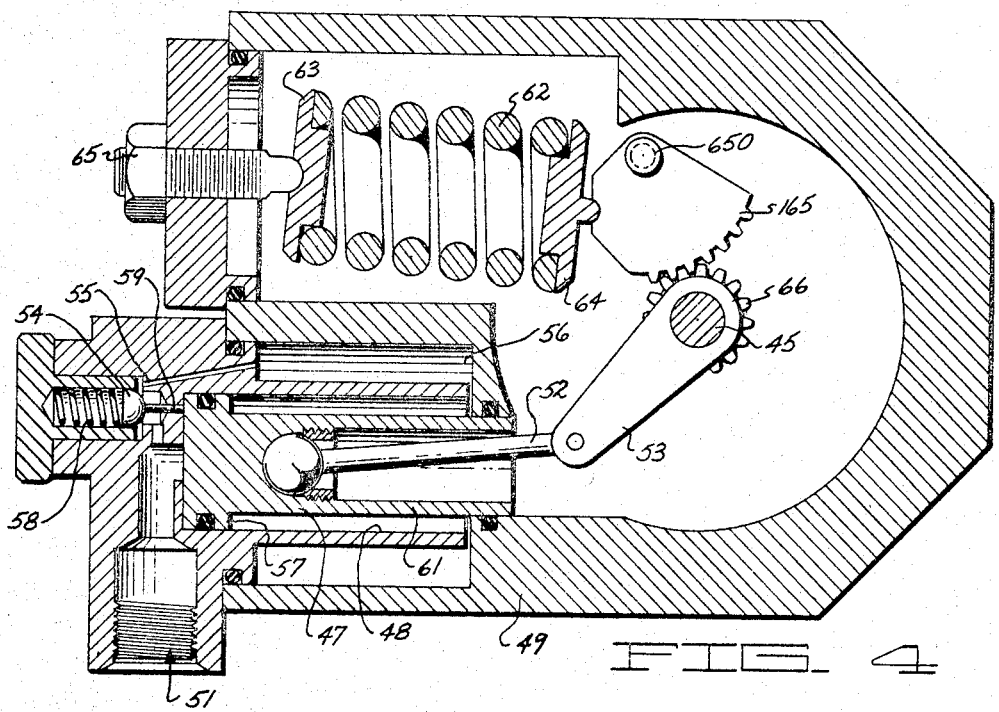
FIG. 4
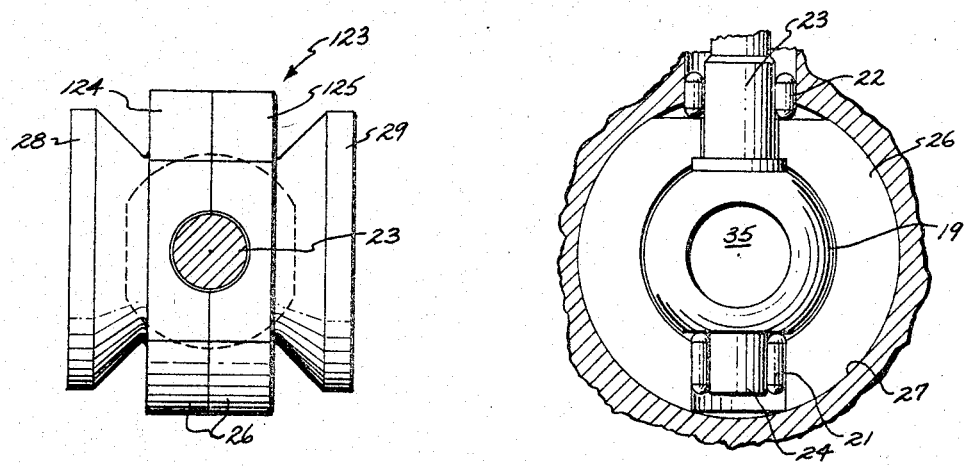
FIG. 2
FIG. 3
INVENTOR.
RODRICK J. KOUTNIK
BY
ATTORNEY United States Patent Office 3,276,737
Patented Oct. 4, 1966

3,276,737
BALL VALVE FOR LOW TEMPERATURE FLUIDS
Rodrick J. Koutnik, Vista, Calif., assignor to Clary Corporation, San Gabriel, Calif., a corporation of California
Filed Sept. 30, 1963, Ser. No. 312,734
6 Claims. (Cl. 251—171)

This invention relates to ball valves and has particular reference to ball valves capable of handling extremely low temperature gases and/or liquids under relatively high pressures.

It is found that when ball valves are used to control such cryogenic fluids as liquid nitrogen, having a boiling point of −320 degrees F., the flexible sealing members, which are generally used to effect a seal between relatively movable parts of the valve, contract to a much greater extent than the surrounding metal parts of the valve and also tend to lose any elastic or plastic qualities they normally exhibit. Accordingly, the sealing members tend to deform to a point where they leak.

It therefore becomes a principal object of the present invention to provide a ball valve of the above type in which contraction of the sealing member or members due to relatively large temperature changes will have little effect on their sealing ability.

Another object is to facilitate assembly and disassembly of a ball valve of the above type.

The manner in which the above and other objects of the invention are accomplished will be readily understood on reference to the following specification when read in conjunction with the accompanying drawings, wherein:

FIG. 2 is a plan view of the seal supporting female frusto-conical members, shown separated from the housing.

FIG. 3 is a transverse section view showing the valve member and is taken along the line 3—3 of FIG. 1.

FIG. 4 is a sectional plan view of the valve actuating mechanism and is taken along the line 4—4 of FIG. 1.

Figure 1:
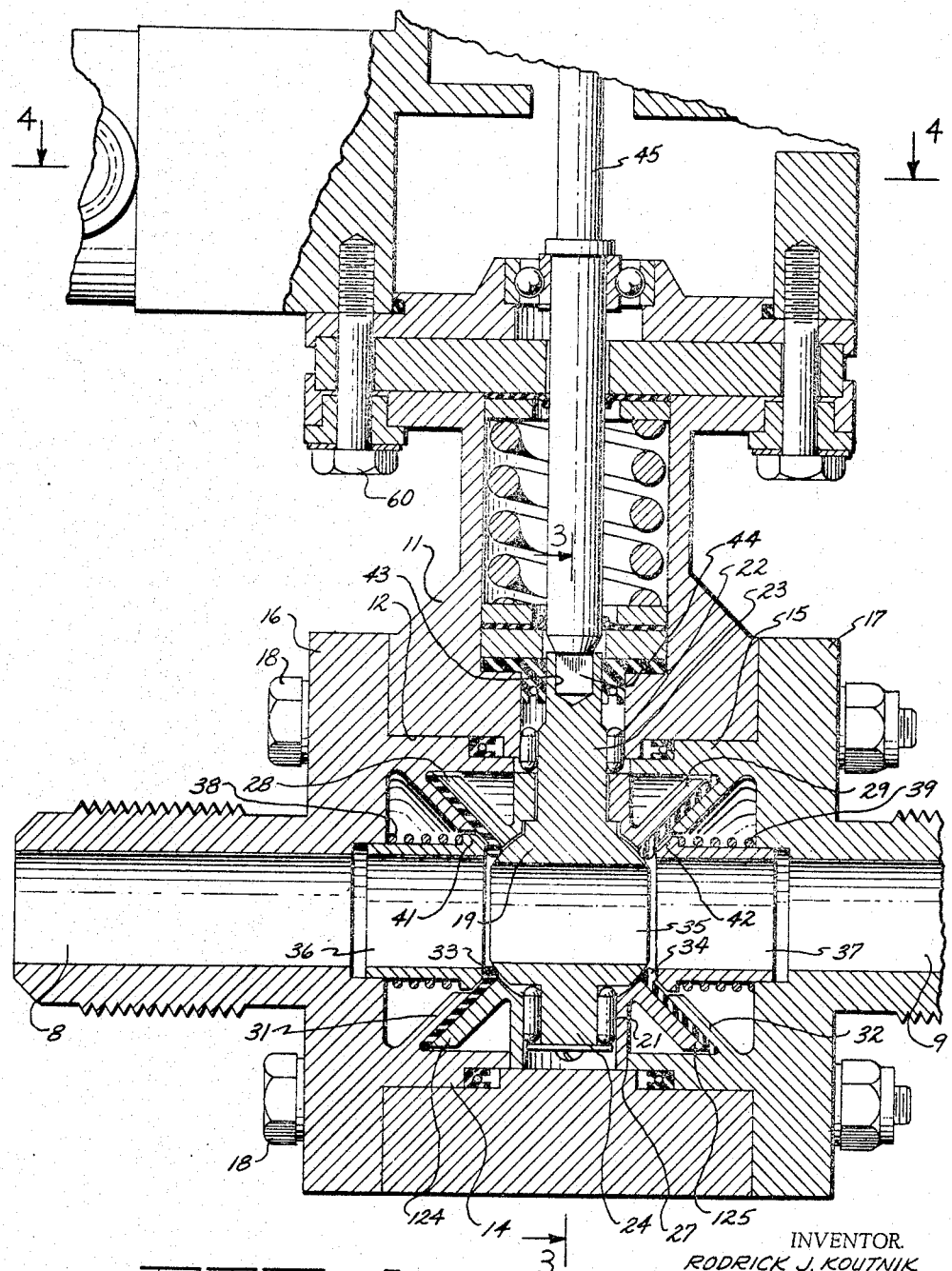
FIG. 1 is a sectional view through a valve embodying a preferred form of the invention.

Referring to FIG. 1, a valve body 11 has a bore 12 therethrough for receiving annular projections 14 and 15 integrally formed on respective end caps 16 and 17, which are attached by bolts 18 to opposite ends of the bore 12. Coaxially arranged passages 8 and 9 are formed in the respective end caps 16 and 17.

The annular projections 14 and 15, along with the body 11, form a chamber 10 in which a spherical shaped valve member 19, having a pair of trunnions 23 and 24, is rotatably supported by a pair of roller bearings 21 and 22. The bearing 22 rides in a vertical bore formed in the body 11 while the bearing 21 rides in a bore formed in a two-piece seal support, generally indicated at 123, FIG. 2.

The support 123 is formed by two identical supporting or bearing members 124 and 125, each comprising an integral annular ring 26 whose outside diameter is substantially the same as the inside diameter of a central section 27 of the bore 12. The projections 14 and 15 of the caps 16 and 17 abut the respective rings 26 to thereby center and hold the members 124 and 125 together, and therefore maintain the valve member 19 in centered position.

The members 124 and 125 have formed thereon female frusto-conical sections 28 and 29 which are coaxially aligned with the bore 12 to receive male frusto-conical sections 31 and 32 formed on respective ones of the cap members 16 and 17.

Thin frusto-conically shaped seals 33 and 34 are formed of a suitable plastic material, such as that known in the art as "Teflon," and are retained in position by the support 123 and cap members 16 and 17 so as to have their smaller diameters engaging the spherical surface of the valve member in positions surrounding a bore 35 in the valve member when the latter is in open condition. The conical surfaces of the seals 33 and 34 converge toward apieces substantially coincident with the center of curvature of the spherical surface of the valve member 19.

The seals 33 and 34 are initially formed so as to be clamped intermediate the female and male frusto-conical sections 28, 31 and 29, 32, respectively. When extremely low temperature fluids are handled by the valve, the seals will tend to shrink, thus contracting radially inwardly over the sections 31 and 32 to effect tighter sealing against the valve member 19. Due to the conical shape, such contraction will not tend to buckle or cause distorting waves in the seals.

To prevent deforming of the seals 33 and 34 at their inner edges and to assume intimate sealing engagement with the valve member at all times, tubular members 36 and 37 are slidably mounted in the flow passages of the caps 16 and 17. Compression springs 38 and 39 surround the respective tubular members and are compressed between their caps and respective lips 41 and 42 of the members to yieldably force the inner edges of the seals against the valve member.

The portion of trunnion 23 which projects above the bearing 22 has a square shaped recess 43 formed in its upper end to receive a square tip 44 of an actuating rod 45.

The actuating means for rotating the valve member 19 from its illustrated open position to a closed position is comprised of a pneumatically operated piston 47, FIG. 4, which is slideable axially in a cylinder 48, fitted in an actuator body 49 which is attached to the valve body 11 by bolts 60.

To open the valve, gas pressure is applied at an inlet 51 to force the piston 47 to the right which, through a connecting rod 52 and an actuator arm 53 attached to the actuator shaft 45, rotates the rod and valve member through 90° to its closed position.

At the same time that the piston is being actuated, the gas pressure will bypass a check valve 54 and pass through a channel 55 into an annular accumulating chamber 56 surrounding cylinder 48. The chamber 56 communicates with a reduced diameter section 61 on the piston. Since the head 57 of the piston is considerably larger in cross sectional area than its reduced diameter section 61, the piston will move to the right to close the valve member while gas is accumulated under pressure in the chamber 56.

Upon release of gas pressure at the inlet 51, the check valve will close under the urge of a compression spring 58 whereupon the pressure entrapped in the chamber 56 will act upon the under side of the piston head 57 to force the piston back to close the main valve.

The check valve 54 has a small stem 59 projecting therefrom which passes through the cylinder body to project into the path of the piston 47 so that as the piston approaches the end of its return stroke it will strike the stem 59 thereby opening the check valve to release any gas pressure remaining in the chamber 56.

A compression spring 62 is provided to assist the piston 47 in returning the valve member 19 to closed position. The spring 62 extends between a pair of retainer caps 63 and 64. The cap 63 is supported by an adjustable anchor bolt 65 and the cap 64 is pivoted to a gear sector 165 fulcrummed at 650 and meshing with a gear 66 fastened to the shaft 45.

It will be noted that the valve is equally effective to control fluid flow under high pressure in either direction through the flow passages 8 and 9.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A valve capable of handling low temperature fluids comprising a valve body having a chamber therein; a passage communicating with said chamber, a valve member having a spherical valving surface; means rotatably supporting said valve member in said chamber to open and close said passage, means in said chamber forming a female frusto-conical surface coaxial with said passage, a yieldable frusto-conical sealing member, and means for pressing said sealing member against said frusto-conical surface, and yieldable means other than said last mentioned means for pressing the inner edge of said sealing member axially in sealing engagement with said spherical surface.

2. A valve comprising a valve body having a bore therethrough; a valve member having a spherical surface and a port therethrough; a pair of bearing members in said bore on opposite sides of said valve member for rotatably supporting at least a portion of said valve member in said bore for movement between open and closed positions, said bearing members each having a female frusto-conical surface thereon; frusto-conical sealing members, and body parts closing respective ends of said bore, said body parts pressing said sealing members against respective ones of said conical surfaces, and the inner edges of said sealing members extending in sealing engagement with said spherical surface of said valve member.

3. A valve according to claim 2 comprising resilient means other than said body parts for pressing said inner edges of said sealing members against said spherical surface of said valve member.

4. A valve according to claim 2 wherein said frusto-conical sealing members are effective to align said valve member therewith along the axis of rotation of said valve member.

5. A valve according to claim 2 comprising a bearing for said valve member carried by said valve body on one side of said bore and a second bearing for said valve member carried by said bearing members on the opposite side of said bore.

6. A valve comprising a valve body having a bore therethrough, a valve member in said bore having a spherical surface and a port therethrough, a pair of bearing members in said bore rotatably supporting at least a part of said valve member for movement about an axis at right angles to the axis of said bore, said bearing members each having a female frusto-conical surface, flexible frusto-conical sealing members, body parts closing respective ends of said bore, said body parts having male frusto-conical surfaces clamping said sealing members against respective ones of said female surfaces, tubular members slideably mounted in said passages for longitudinal movement, and spring means yieldably pressing said tubular members against said sealing members adjacent the inner edges thereof whereby to press said inner edges of said sealing members into sealing engagement with the spherical surface of said valve member.

References Cited by the Examiner

UNITED STATES PATENTS

| 2,533,931 | 12/1950 | Hartley | 251—174 |
| 2,698,731 | 1/1951 | Koehler | 251—174 X |
| 2,768,806 | 10/1956 | Koehler | 251—174 |
| 2,837,308 | 6/1958 | Shand | 251—174 |
| 2,883,146 | 4/1959 | Knox | 251—174 |
| 3,076,631 | 2/1963 | Grove | 137—242 X |
| 3,127,182 | 3/1964 | Wardleigh | 251—306 X |
| 3,181,834 | 5/1965 | Jennings | 251—174 X |
| 3,208,718 | 9/1965 | White | 251—315 X |

WILLIAM F. O'DEA, *Primary Examiner.*

CLARENCE R. GORDON, *Examiner.*